US011193796B2

(12) United States Patent
Utermoehlen et al.

(10) Patent No.: US 11,193,796 B2
(45) Date of Patent: Dec. 7, 2021

(54) ROTATIONAL ANGLE SENSOR

(71) Applicant: Robert Bosch GmbH, Stuttgart (DE)

(72) Inventors: Fabian Utermoehlen, Lippstadt (DE); Andreas Merz, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 16/619,710

(22) PCT Filed: Jun. 13, 2018

(86) PCT No.: PCT/EP2018/065569
§ 371 (c)(1),
(2) Date: Dec. 5, 2019

(87) PCT Pub. No.: WO2018/234108
PCT Pub. Date: Dec. 27, 2018

(65) Prior Publication Data
US 2020/0200569 A1    Jun. 25, 2020

(30) Foreign Application Priority Data
Jun. 23, 2017   (DE) .................... 10 2017 210 655.7

(51) Int. Cl.
*G01D 5/20*     (2006.01)
*H01F 38/14*    (2006.01)

(52) U.S. Cl.
CPC ......... *G01D 5/2073* (2013.01); *G01D 5/2053* (2013.01); *H01F 38/14* (2013.01)

(58) Field of Classification Search
CPC ......... H01F 38/14; H01F 5/04; G01R 33/075; G01D 5/2073; G01D 5/145; G01D 5/2053;

(Continued)

(56) References Cited

U.S. PATENT DOCUMENTS

2017/0160101 A1*   6/2017   Frese ..................... G01D 5/20
2019/0219421 A1*   7/2019   Hoffmann ............ G01D 11/245

FOREIGN PATENT DOCUMENTS

DE   197 38 836 A1   3/1999
DE   697 15 848 T2   5/2003
(Continued)

OTHER PUBLICATIONS

International Search Report corresponding to PCT Application No. PCT/EP2018/065569, dated Oct. 4, 2018 (German and English language document) (5 pages).

*Primary Examiner* — Melissa J Koval
*Assistant Examiner* — Trung Q Nguyen
(74) *Attorney, Agent, or Firm* — Maginot, Moore & Beck LLP

(57) ABSTRACT

A rotational angle sensor includes a stator element and a rotor element. The rotor element is mounted to rotate about a rotation axis. The stator element has a transmitter coil and a receiver coil that are arranged on a circuit board. The receiver coil substantially encloses the rotation axis in a circumferential direction and is formed by a plurality of adjacent partial windings. The partial windings are each formed from sections of two circular-arc-shaped conductor paths curved to the left and two circular-arc-shaped conductor paths curved to the right. A first conductor path curved to the right extends through a first point on a first circle, a second point on a third circle and rotated relative to the first point by a quarter of a measuring range of the sensor, and a third point on a second circle and rotated relative to the first point by half the measuring range.

12 Claims, 5 Drawing Sheets

(58) Field of Classification Search
CPC ...... G01D 5/14; G01D 5/142; G01D 5/24438; H02K 3/28; G01B 7/30
USPC ................ 324/245–252, 200, 207.11–207.21
See application file for complete search history.

(56) References Cited

FOREIGN PATENT DOCUMENTS

| | | |
|---|---|---|
| DE | 699 12 273 T2 | 8/2004 |
| DE | 10 2004 027 954 A1 | 12/2005 |
| DE | 10 2015 220 615 A1 | 4/2017 |
| DE | 10 2016 202 877 B3 | 6/2017 |
| EP | 0 909 955 B1 | 9/2009 |
| EP | 2 570 776 A2 | 3/2013 |

\* cited by examiner

ROTATIONAL ANGLE SENSOR

This application is a 35 U.S.C. § 371 National Stage Application of PCT/EP2018/065569, filed on Jun. 13, 2018, which claims the benefit of priority to Serial No. DE 10 2017 210 655.7, filed on Jun. 23, 2017 in Germany, the disclosures of which are incorporated herein by reference in their entirety.

BACKGROUND

The disclosure relates to a rotation angle sensor, with which, for example, a rotation angle between a shaft and another component can be determined. The disclosure further relates to a stator element for such a rotation angle sensor. In the context of this application the term 'comprise' is used synonymously with the term 'have'.

In order to measure angles of rotation, angle sensors are known, for example, in which a magnet is rotated across a corresponding magnetic field sensor. The measurement of the magnetic field vector then allows the rotation angle to be deduced. Such sensors also respond to external magnetic fields which are caused, for example, by a current flow of adjacently arranged power cables and can be very sensitive to interference.

Another type of rotation angle sensor uses an eddy current effect. In this case, for example, a metallic target is moved through sensor coils that are supplied with an alternating voltage and induce an eddy current in the target. This leads to the reduction of the inductances of the sensor coils and allows the rotation angle to be deduced via a frequency change. For example, the coils are a component of an oscillator circuit whose resonance frequency shifts due to a change in the inductance. This type of rotation angle sensor can have a high cross-sensitivity to mounting tolerances, however (especially a tilting of the target), as well as to other influences such as temperature. Also, the generated frequency can be perturbed by external electromagnetic fields (injection locking), because the working frequency is usually in the range of several tens of MHz.

Patent EP 0 909 955 B1 discloses a rotation angle sensor with planar conductor loops short-circuited to a target, which interact with the alternating electromagnetic field of an exciter coil.

In this case, a signal is generated which resembles a square-wave signal depending on the angle of rotation and which must be converted into the rotation angle by an evaluation unit, requiring considerable effort. Due to the steep edges of such signals the angular resolution can be restricted.

SUMMARY

Embodiments of the present disclosure can enable in a convenient manner a robust, inexpensive and compact rotation angle sensor, in which the generated sensor signals can be easily evaluated.

Ideas for embodiments of the present disclosure can be considered to be based, among other things, on the ideas and insights as described below.

The disclosure relates to a rotation angle sensor, which can be used in particular in an environment with high levels of electromagnetic interference fields. For example, the rotation angle sensor can be used in the engine compartment or in the vicinity of the engine compartment of a vehicle, for example, to determine a position of a throttle valve, a rotor position of a BLDC motor, a position of an accelerator pedal or a position of a camshaft. The rotation angle sensor described in the following is inexpensive, requires little installation space and is based on a simple measurement principle.

According to a first aspect of the disclosure a rotation angle sensor for detecting a rotation angle is proposed. The rotation angle sensor comprises a stator element with a transmitter coil and at least two receiver coils, wherein the transmitter coil and the receiver coils are arranged on a printed circuit board. The rotation angle sensor additionally comprises or has a rotor element which is mounted with respect to the stator element such that it can rotate about an axis of rotation and via which the transmitter coil is inductively coupled to the receiver coils, so that the inductive coupling is dependent on an angle of rotation between the stator element and the rotor element and the transmitter coil induces at least two angle-dependent alternating voltages in the receiver coils. In this case the rotational angle sensor has a measuring range which is the quotient of 360° and an integer natural number. It is particularly advantageous that the rotation angle sensor has a measuring range of <360°.

It is provided that the receiver coils substantially surround the axis of rotation in a circumferential direction, wherein each receiver coil winding is formed by a multiplicity of adjacent partial windings, wherein adjacent partial windings are arranged in the opposite direction to the direction of current flow. Each partial winding, with respect to a radial direction which extends outwards from the axis of rotation, is formed from sections of at least two circular-arc-shaped conductor tracks curved to the left and two circular-arc-shaped conductor tracks curved to the right. All conductor tracks curved to the left and all conductor tracks curved to the right have the same radius of curvature. All conductor tracks curved to the left and all conductor tracks curved to the right extend between two concentric circles about the axis of rotation, a first circle with a first radius and a second circle with a second radius, wherein a third circle is present which is concentric with the first circle radius and has a third radius which is derived from the mean value of the first radius and the second radius, wherein a first conductor track curved to the right passes through 3 points: through a first point which lies on the first circle; through a second point which lies on the third circle and is rotated with respect to the first point in the circumferential direction by a quarter of the measuring range; and through a third point, which lies on the second circle and is rotated with respect to the first point in the circumferential direction by half the measuring range. The other conductor tracks curved to the right are derived from the preceding conductor track curved to the right by a rotation about the axis of rotation in the circumferential direction by half the measuring range. The conductor tracks curved to the left are obtained by reflections of the conductor tracks curved to the right, in each case along a radial line which extends from the axis of rotation through the intersection point of the respective conductor track curved to the right with the third circle.

A partial winding of a receiver coil can be defined as a part of the receiver coil which is surrounded by conductor tracks of the receiver coil that do not mutually intersect. The orientation of a partial winding is determined by a current flow through the receiver coil. When a current flow occurs through the receiver coil, counter-orientated partial windings each have counter-orientated current flows, i.e. in the case of a partial winding with a first orientation, the current flows through the partial winding clockwise or to the right, and in the case of a partial winding with a second, opposite orientation, the current flows through the partial winding counter-clockwise or to the left.

A partial winding can be structured, purely by way of example, as a diamond with curved side faces. The four side faces of such a diamond can be formed, for example, by two partial sections of two conductor tracks curved to the left and two conductor tracks curved to the right.

For example, the direction of current flow in at least two sections of the conductor tracks curved to the left, which form a partial winding, can be oriented opposite to each other. Similarly, the direction of current flow in at least two sections of the conductor tracks curved to the right, which form a partial winding, can be oriented opposite to each other.

The structure of the partial windings should be understood such that an imaginary straight line which emanates from the axis of rotation and extends in the radial direction intersects one circular-arc-shaped conductor track of the receiver coil curved to the left and one curved to the right, if the straight line passes through the interior of the receiver coil. In this way it can also be ensured, for example, that the amplitude of the alternating voltage or the measuring signal induced in the receiver coil essentially depends on the angle of rotation according to a sine function.

The proposed design of the rotation angle sensor allows the sum of the partial voltages induced by the transmitter coils to compensate each other (as long as no target or rotor element is present) and 0 volts is output at the receiver coil as the output signal. By using this fact it is advantageously possible, for example, to implement a self-diagnosis function, since the sensor can detect that a target or the rotor element is either missing or has at least one electrical discontinuity. This is particularly advantageous especially in relation to "Automotive Safety Integrity Level" (ASIL) and the associated diagnostic functions. Furthermore, EMC interference sources or external magnetic fields, which in principle can be assumed to be a homogeneous field, can be effectively suppressed. The design of the stator element with partial windings which substantially surround the axis of rotation, compared to a stator element with a merely segment-like structure, provides an increased signal-to-noise ratio, a lower tolerance sensitivity and thus a higher accuracy.

The stator element, which can also carry an evaluation unit, can be arranged, for example, opposite to the end of a shaft on which the rotor element is mounted. However, it can also be arranged around the shaft so that the shaft pierces the stator element. The rotor element can carry one or more induction segments which co-rotate with the shaft, overlap the receiver coils and thus change the inductance of the receiver coils or the respective inductive coupling between the transmitter coil and the receiver coils. If the transmitter coil is energized with an alternating voltage, alternating voltages are induced in the receiver coils, whose amplitude depends on the respective inductive coupling. From these alternating voltages and/or their amplitudes, which the sensor emits as measurement signals, the evaluation unit, for example, can then calculate a rotation angle signal. The rotation angle sensor can thus be implemented cost-effectively, since no expensive magnets are needed.

The notion that the receiver coils substantially completely surround the axis of rotation in a circumferential direction should be understood to mean that the receiver coils fully surround the axis of rotation in the circumferential direction by at least 90%, advantageously by at least 95% and very particularly advantageously by at least 99%, i.e. at least approximately covering a 360° angular range. Minor deviations from a full 360° rotation can be arise, for example, as a result of connecting cables.

According to one embodiment it is provided that each partial winding from sections of exactly two circular-arc-shaped conductor tracks curved to the left and from sections of exactly two circular-arc-shaped conductor tracks curved to the right. This advantageously enables a particularly space-saving production of the partial windings and hence of the receiver coil, in particular on only two sides of the printed circuit board. Furthermore, this means that a sinusoidal measurement signal can be advantageously generated, which can be evaluated particularly simply.

Alternatively or additionally it can be provided that the sections of the circular-arc-shaped conductor tracks curved to the left and the circular-arc-shaped conductor tracks curved to the right, viewed in the circumferential direction, extend substantially over an angular range of at least 20% of the measuring range, preferably over at least 23% of the measuring range, for example, over 25% of the measuring range. This advantageously causes the partial windings overlap a particularly large surface area. A further advantageous result is that ideally there is virtually no section on the printed circuit board, viewed in the circumferential direction, which is not overlapped by a winding. As a result, the measurement accuracy can be advantageously improved.

According to one embodiment it is provided that the printed circuit board extends between an inner circle having an inner radius and an outer circle, concentric with the inner circle and having an outer radius. The inner circle is concentric with the axis of rotation, wherein the first radius of the first circle is larger than the inner radius by at least 1 mm and at most 5 mm. Alternatively or in addition, it is provided that the second radius of the second circle is smaller than the outer radius by at least 1 mm and at most 5 mm.

The inner radius can be determined, for example, by means of a cutout in the printed circuit board, through which, for example, the shaft can be inserted. The outer radius can be, for example, an outer contour of the printed circuit board which can be designed to be circular or annular in shape, for example.

The fact that the first radius is larger than the inner radius by at least 1 mm and at most 5 mm ensures, on the one hand, sufficient distance to a cutout through the circuit board in order to prevent damage to the receiver coils due to tolerances in the manufacture. At the same time, the first radius of the first circle is small enough to enable the widest possible coverage of the measurement field by the receiver coils.

In this case it can also be provided to arrange the transmitter coil at least partially on the printed circuit board between the first circle and the inner circle. In this way, a very compact and miniaturized stator element can be assembled.

The fact that the second radius of the second circle is smaller than the outer radius by at least 1 mm and at most 5 mm can advantageously ensure that a particularly large surface area is available for the receiver coils. This makes it possible to improve the signal-to-noise ratio in a particularly advantageous way. Due to the minimum distance of 1 mm to the outer radius of the outer circle, any damage to the receiver coil as a result of tolerances during the manufacture or the handling or assembly of the sensor is advantageously avoided, as there is sufficient space to hold the printed circuit board at its outer edges.

Also advantageously, the transmitter coil can be arranged at least partially in an area between the outer circle and the second circle. In this way, a particularly large transmitter coil with a large radius can be implemented.

According to one embodiment, it is provided that the rotor element and the receiver coils are designed in such a way that an alternating voltage is induced in the receiver coils, whose amplitude depends sinusoidally on the rotation angle.

In other words, due to the geometry of the receiver coils and the rotor element the measuring signal provided by a receiver coil, i.e. the amplitude of the alternating voltage induced in the receiver coil, depends on the rotation angle in a sinusoidal manner or according to a sine function.

It is important to understand that a sinusoidal measurement signal can be a signal that deviates by less than 5% or less than 1% from a pure sine function.

The sinusoidal amplitude makes a particularly simple evaluation possible, for example, without complex electronics or software, which has a high degree of robustness. In addition, by the application of trigonometric laws signal validations are available provided at least two receiver coils are present.

According to one embodiment of the disclosure the at least two receiver coils are formed in (only) two layers of the printed circuit board, i.e., in particular on the external surfaces.

In this case it can be provided, for example, that all conductor tracks curved to the right are arranged on a first side of the printed circuit board and all conductor tracks curved to the left are arranged on a second side of the conductor track opposite to the first side.

This allows the printed circuit board to be produced at low cost. A multi-layer printed circuit board, in particular a printed circuit board with more than two layers, is not required. As a result, the production can be significantly simplified and implemented cost-effectively.

This can be achieved by vias being provided at ends of the circular-arc-shaped conductor tracks, at which circular arc-shaped conductor tracks in different layers are connected. In particular, the circular-arc-shaped conductor tracks of a receiver coil can be arranged alternately in opposite layers of the printed circuit board.

Thus, it is advantageously ensured that the stator element can be built with an only 2-layer printed circuit board, for example, made from an FR4 material or better.

According to one embodiment, it is provided that at ends of the circular-arc-shaped conductor tracks vias are provided, at which circular arc-shaped conductor tracks in different layers are connected. This advantageously ensures that the partial windings of the receiver coils do not intersect on the same side of the printed circuit board, which would thereby cause short circuits. This design allows the receiver coil to be equipped with a high density of partial windings, which enhances the measurement signal.

According to one embodiment it is provided that the printed circuit board has a first connection via and a second connection via, wherein the two connection vias are arranged on the third circle immediately adjacent to a virtual point of intersection of a right-hand curved conductor track and a left-hand curved conductor track. The conductor track curved to the right and the conductor track curved to the left are interrupted in the region of the two connection vias. At each of the connection vias a radially outward section converging with a radially inwards partial section of the conductor track curved to the right and a partial section of the conductor track curved to the left are electrically conductively connected to each other.

This advantageously ensures that adjacent partial windings of the receiver coil can be designed in a particularly simple and space-saving manner with opposite orientations in relation to the direction of current flow. With this structure a reversal of the polarity of the current flow at a point radially outside the second circle or radially between the axis of rotation and the first circle is redundant, which avoids the production of additional conductor track sections that could generate additional signal components.

According to one embodiment it is provided that the receiver coils are offset with respect to one another in the circumferential direction by an angle which is defined by the measuring range divided by a number of the receiver coils.

The number of receiver coils is understood here to mean the total number of the receiver coils of a measuring system. For example, if two redundant measuring systems are accommodated on the same printed circuit board, each measuring system consisting of three receiver coils, then the number of receiver coils corresponds to m=3.

The proposed angular offset provides a signal which is particularly easily evaluated, thereby increasing the precision of the rotation angle detection.

This is the case because in this way, maximally different measurement signals are produced per receiver coil. This advantageously improves the accuracy of the angle determination.

For example, on the stator element two or three receiver coils, offset relative to each other, for example, in the circumferential direction by a specific angle, can supply the angularly offset measurement signals. In the case of two or three receiver coils, sine-wave signals can be particularly easily evaluated as measuring signals, since a reverse transformation is possible. This can be an arctangent transformation in the case of two receiver coils (i.e. a two-phase system) or a Clarke transformation in the case of three receiver coils (i.e. a three-phase system). With these reverse transformations it is also possible to easily compensate for offsets from the measurement signals, which arise, for example, due to mechanical tolerances.

It is also possible that two redundant receiver coil systems or measurement systems (for example, each consisting of two or three receiver coils) can be located on the stator element. In this case, the measurement signals of the respective receiver coil system or measurement system can be evaluated in the above-mentioned manner. As a result, in the event of a failure of a system it remains possible to determine the rotation angle, which can increase safety in critical systems.

According to one embodiment of the disclosure, the rotor element has at least one induction segment with a different conductivity than that of adjacent areas located in the circumferential direction around the axis of rotation of the rotor element. For example, the induction segment may be a metallic segment (with a high conductivity) which is mounted on a non-metallic part of the rotor element, it may be a metallic elevation on the rotor element, but it can also be a recess (with low conductivity) in a metallic rotor element.

For example, the at least one induction segment can be in the shape of an annular sector. It is possible that the rotor element has a plurality of identically shaped induction segments. This enables a particularly simple and cost-effective design of the rotor element, which can also be referred to as a target. Furthermore, this does not cause any imbalance at high rotation speeds of the target.

According to one embodiment of the disclosure, the at least one induction segment has an opening angle in the circumferential direction (i.e. a maximum angle defined by the induction segment), which is half the size of the measuring range of the rotation angle sensor. Also, partial windings of the receiver coils can have such an opening angle. In this way, a maximum change in the measurement signals over the measuring range can be achieved. This advantageously allows an improved accuracy to be achieved and a more robust signal to be provided.

According to one embodiment of the disclosure, the at least one induction segment has a plurality of radial recesses which have a different conductivity than the induction segment. The recesses can be arranged at an edge in the circumferential direction of the induction segment, wherein the induction segment can have an opening angle greater than half the measuring range. The recesses can be spaced apart in the circumferential direction by an angle which is half the size of the measuring range of the rotation angle sensor. The induction segment can be split into a large sub-segment and smaller sub-segments spaced apart in the circumferential direction.

These recesses can be used to shape the measurement signal, since the small sub-segments can affect the inductive coupling between partial windings that are arranged adjacent to a partial winding which is currently covered by the large sub-segment. In particular, a measurement signal, which as a result of the receiver coils also has minor deviations from a sine function, can be influenced with the induction segment in such a way that the deviations become smaller.

According to a second aspect of the disclosure a stator element for a rotation angle sensor is proposed, as is described above and below. The stator element for a rotation angle sensor with a measuring range which is given by the quotient of 360° and an integer natural number comprises a stator element with a transmitter coil and at least two receiver coils. The transmitter coil and the receiver coils are arranged on a printed circuit board. The receiver coils substantially completely surround the axis of rotation in a circumferential direction. Each receiver coil is formed by a multiplicity of adjacent partial windings. Adjacent partial windings are oriented in opposite directions with respect to the direction of current flow, wherein each partial winding, with respect to a radial direction which extends outwards from the axis of rotation, is formed from sections of at least two circular-arc-shaped conductor tracks curved to the left and two circular-arc-shaped conductor tracks curved to the right. All conductor tracks curved to the left and all conductor tracks curved to the right have the same radius of curvature. All conductor tracks curved to the left and all conductor tracks curved to the right extend between two concentric circles around the axis of rotation, a first circle with a first radius and a second circle with a second radius. A third circle is present, which is located concentric with the first circle and has a third radius which is given by the mean value of the first radius and the second radius. A first conductor track curved to the right passes through three points: through a first point which lies on the first circle, through a second point which lies on the third circle and is rotated with respect to the first point in the circumferential direction by a quarter of the measuring range, and through a third point which lies on the second circle and is rotated with respect to the first point in the circumferential direction by half the measuring range. The other conductor tracks curved to the right are derived from the preceding conductor track curved to the right by a rotation about the axis of rotation in the circumferential direction by half the measuring range. The conductor tracks curved to the left are obtained by reflections of the conductor tracks curved to the right, in each case along a radial line which extends from the axis of rotation through the intersection point of the respective conductor track curved to the right with the third circle.

With the stator element designed in this way, a particularly cost-effective, highly accurate rotation angle sensor which is simple to construct can be produced.

It goes without saying that both the conductor tracks curved to the right and those curved to the left can consist of a plurality of partial conductor tracks which are directly adjacent to each other. For example, the partial windings can be constructed from a total of four sections, two of which belong to two conductor tracks curved to the left and two to conductor tracks curved to the right.

The number of the partial windings can be equal to double the integer natural number by which the measuring range is defined.

It can be provided that the transmitter coil is arranged concentric with the axis of rotation.

BRIEF DESCRIPTION OF THE DRAWINGS

In the following, embodiments of the disclosure are described with reference to the attached drawings, where neither the drawings nor the description are to be interpreted as restricting the disclosure.

The figures are purely schematic and not drawn to scale. Identical reference numerals in the figures refer to the same or equivalent features.

DETAILED DESCRIPTION

Figure 1:
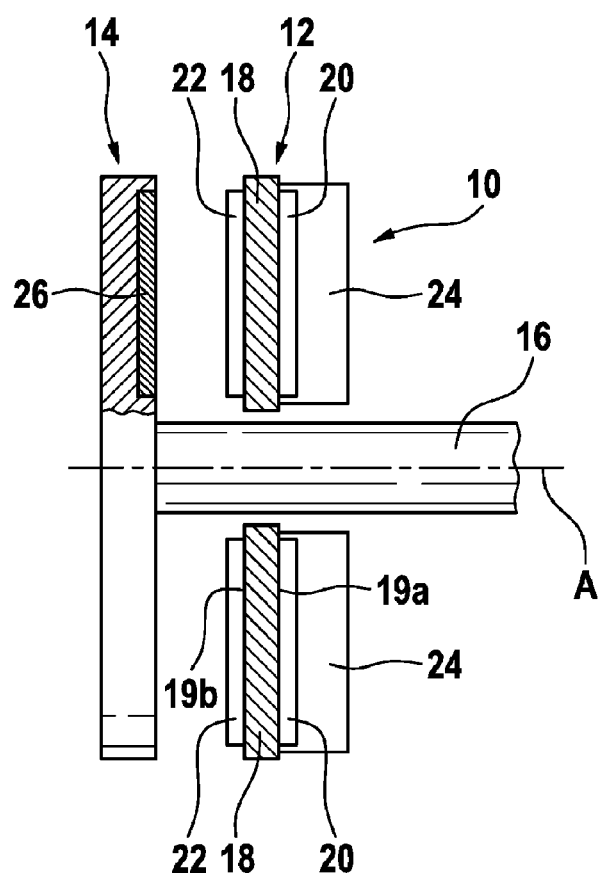
FIG. 1 shows a schematic view of a longitudinal section through a rotation angle sensor according to one embodiment of the disclosure.

FIG. 1 shows a rotation angle sensor 10 consisting of a stator element 12 and a rotor element 14. The rotor element 14 can be mounted on a shaft 16 of a component, such as a throttle valve, a motor, a camshaft, an accelerator pedal, etc., or be provided by said shaft 16. The shaft 16 is rotatable about the axis of rotation A, which defines an axial direction. The stator element 12 is located opposite to the rotor element 14 in the corresponding axial direction. For example, the stator element 12 can be arranged around the shaft 16. However, it can be arranged (not shown here) on the side facing the shaft, opposite the rotor element 14.

The stator element 12 comprises a printed circuit board 18, on which a transmitter coil 20 and a plurality of receiver coils 22 with conductor tracks are implemented on the printed circuit board 18. The conductor tracks of the coils 20, 22 can be located on the two sides, a first side 19a and a second side 19b, of the printed circuit board 18. The conductor tracks can be electrically connected to each other by means of vias through the printed circuit board 18. Further components for an evaluation unit 24 can be located on the printed circuit board 18. The evaluation unit 24 can supply the transmitter coils 20 with an alternating voltage and determine induced alternating voltages in the receiver coils 22. Based on this measurement, the evaluation unit 24 can determine a relative angle of rotation between the stator element 12 and the rotor element 14.

The rotor element 14 comprises one or more induction segments 26, which are positioned in the axial direction of the transmitter coils 20 and opposite the receiver coils 22. The induction segments 26 can be arranged, as shown in FIG. 1, on a further printed circuit board which is mounted on the shaft 16. It is also possible that the one or more induction segments 26 are generated by machining one end of the shaft 16, or consist of a stamped or milled solid metal which is pressed onto the shaft, for example.

Figure 2:
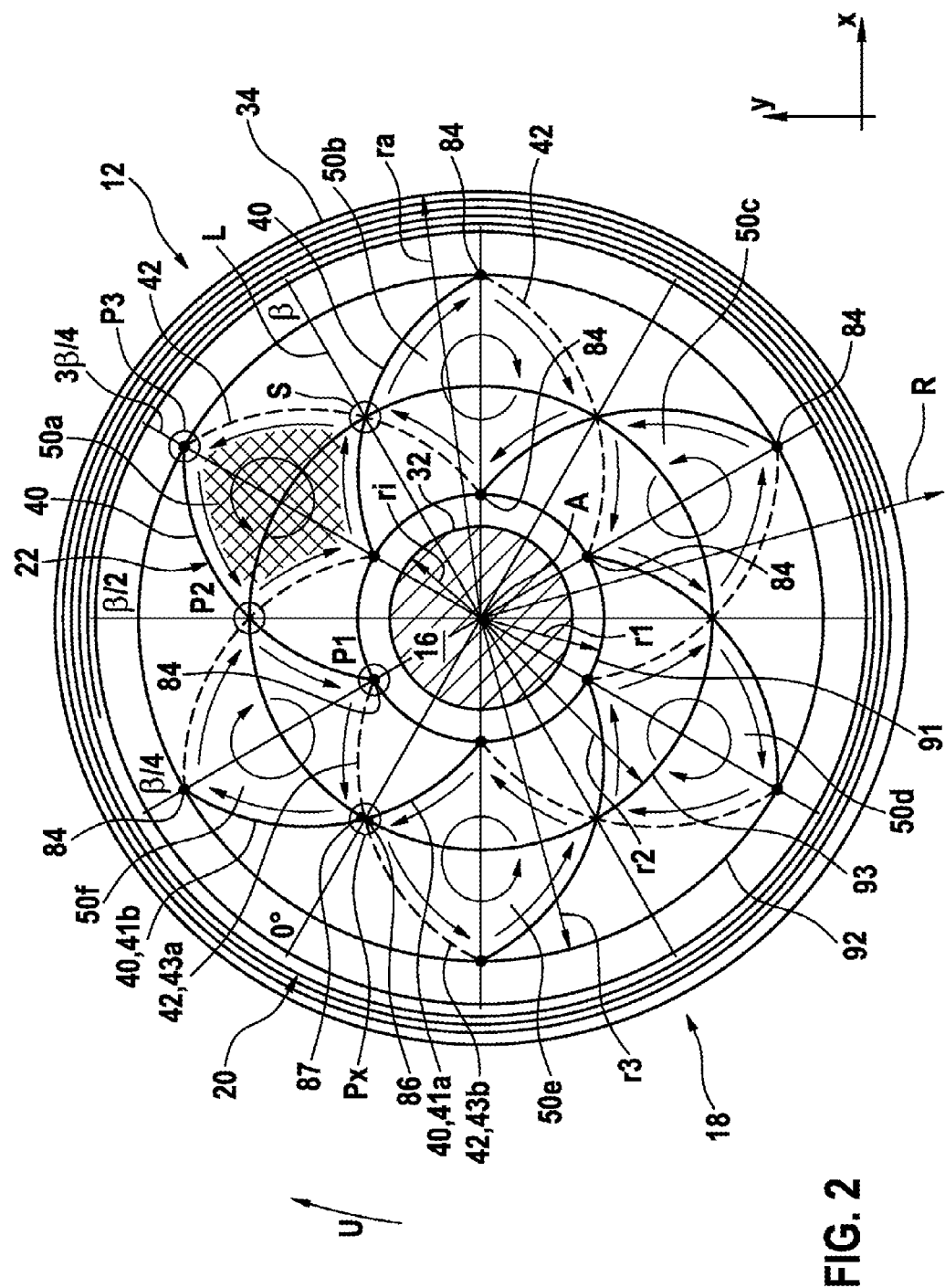
FIG. 2 shows a schematic plan view of a stator element for the rotation angle sensor from FIG. 1, in which only a first receiver coil is shown.

FIG. 2 shows a stator element 12 of a rotation angle sensor 10. In this example, for reasons of clarity only a single receiver coil 22 is drawn, to illustrate the principle of the design of the receiver coils 22. The measuring range of the stator element in the present case is 120°, i.e. the integer natural number n evaluates here to n=3.

The stator element 12 here comprises one transmitter coil 20 and at least two receiver coils 22, of which only one is shown, however. Transmitter coil 20 and receiver coil 22 are arranged on a printed circuit board 18 with a first side 19a which is facing towards the observer and a second side 19b facing away from the first, which is directed away from the observer. Both the transmitter coil 20 and the receiver coil 22 are implemented as planar coils. The transmitter coil 20 can have a multiplicity of conductor loops, which can also be implemented in multiple layers of a multilayer printed circuit board 18 to allow a sufficiently large field to be generated.

The printed circuit board 18 in this example has a circular shape. The circumferential direction is shown by an arrow with the reference symbol U, the radial direction is indicated by an arrow which extends radially outwards from an axis of rotation A and has the reference symbol R. The receiver coil 22 completely surrounds the axis of rotation A in the circumferential direction U. The receiver coil 22 is formed by a plurality of adjacent partial windings 50a, 50b, 50c, 50d, 50e, 50f, wherein adjacent partial windings 50a to 50f are arranged in the opposite direction with respect to the direction of current flow. Here they have the shape of a diamond with curved edges (see the shaded partial winding 50a).

The direction of current flow of each partial winding is indicated by the annular arrows. Each partial winding, with respect to a radial direction R which extends outwards from the axis of rotation A, in the exemplary embodiment shown is formed from two sections of two circular-arc-shaped conductor tracks 42 curved to the left and two sections of two circular-arc-shaped conductor tracks 40 curved to the right. On some of these conductor tracks arrows are shown, which are intended to illustrate the direction of the current flow.

Adjacent pairs of partial windings have the same surface area: thus in the example shown, the surface areas of the partial windings 50a, 50b and also the partial windings 50c, 50d and the partial windings 50e, 50f are equal in size pairwise, so that (provided no additional coupling with the rotor element 14 takes place) a homogeneous magnetic field is created by the receiver coil 22a. This is because voltages of equal size but opposite polarity are induced in the partial coils 50a, 50b. In the illustrated exemplary embodiment, all partial windings 50a-50f have essentially the same surface area.

Based on this, the rotation angle sensor 10 or the evaluation unit 24 can operate a self-diagnosis function, with which it can be detected whether the rotor element 14 is missing and/or whether one of the receiving coils has an electrical discontinuity. In addition, EMC interference sources, which usually exist in the form of a homogeneous field, can be suppressed.

All conductor tracks 42 curved to the left and all conductor tracks 40 curved to the right have the same radius of curvature, wherein all conductor tracks 42 curved to the left and all conductor tracks 40 curved to the right extend between two concentric circles around the axis of rotation A, a first circle 91 with a first radius r1 and a second circle 92 with a second radius r2. In the drawing a third circle 93 is shown, which extends concentrically to the first circle 91 and has a third radius r3. The third radius r3 is given by the mean value of the first radius r1 and the second radius r2 as r3=(r1+r2)/2. A first conductor track 40 curved to the right passes through three points: through a first point P1 which lies on the first circle 91; through a second point P2 which lies on the third circle 93 and is rotated with respect to the first point P1 in the circumferential direction U by a quarter of the measuring range β; through a third point P3, which lies on the second circle 92 and is rotated with respect to the first point P1 in the circumferential direction U by half the measuring range β.

By way of example a radial direction R is drawn in FIG. 1. This radial direction R intersects a circular-arc-shaped conductor track 40, which is curved to the right, and a circular-arc-shaped conductor track 42, which is curved to the left. The same applies to all radial directions R within the measuring range β with the exception of the angles where the circular conductor tracks 40, 42 are connected to each other.

The other conductor tracks 40 curved to the right are derived from the preceding conductor track 40 curved to the right by a rotation about the axis of rotation A by half the measuring range β in the circumferential direction U. The conductor tracks 42 curved to the left are obtained by reflections of the conductor tracks 40 curved to the right, in each case along a radial line which extends from the axis of rotation A through the intersection point S of the respective conductor tracks 40 curved to the right with the third circle 93. In the figure illustrated, for reasons of clarity only one of the radial lines L and only one point of intersection S is labelled with the respective reference symbol.

At the ends of the circular-arc-shaped conductor tracks 40, 42, vias 84 are provided, at which or in which the circular-arc-shaped conductor tracks 40, 42 in different layers of the printed circuit board 18 are connected. Thus, for example, the conductor tracks 40 curved to the right are arranged on the first side 19a of the printed circuit board 18 and the conductor tracks 42 curved to the left are arranged on the second side 19b of the circuit board 18 facing away from the first side 19a. In this way, an electrical short circuit is prevented between the overlapping partial windings 50a-50f. The receiver coil 22 in this example is surrounded by a transmitter coil 20, which extends between the first r1 and the outer radius ra.

In the present case, the measuring range β=120°. Six partial windings 50a-50f are therefore formed.

To obtain the opposite orientation of adjacent partial windings 50a-50f with respect to the current flow direction without the need for a reversal of the direction of current flow in a region outside the second circle 92, a first connection via 86 and a second connection via 87 are provided on the printed circuit board 18. The two connection vias 86, 87 are arranged on the third circle 93 immediately adjacent to a virtual intersection point Px of a conductor track 40 curved to the right and a conductor track 42 curved to the left. The conductor track 40 curved to the right and the conductor track 42 curved to the left are interrupted in the region of the two connection vias 86, 87. At each of the connection vias 86, 87 a radially outward section converging with a radially inwards partial section 41 of the conductor track 40 curved to the right and a partial section 43 of the conductor track curved 42 to the left are electrically conductively connected to each other.

The virtual intersection point Px is not a real point of intersection of the conductor tracks 40, 42, because these run in different layers of the printed circuit board 18. The virtual intersection point Px can coincide with the intersection point S of the conductor track 40 curved to the right with the third circle 93. For reasons of clarity, in FIG. 2 the intersection point S, which is coincident with the virtual intersection point Px, is not indicated with the reference symbol S.

Figure 3:
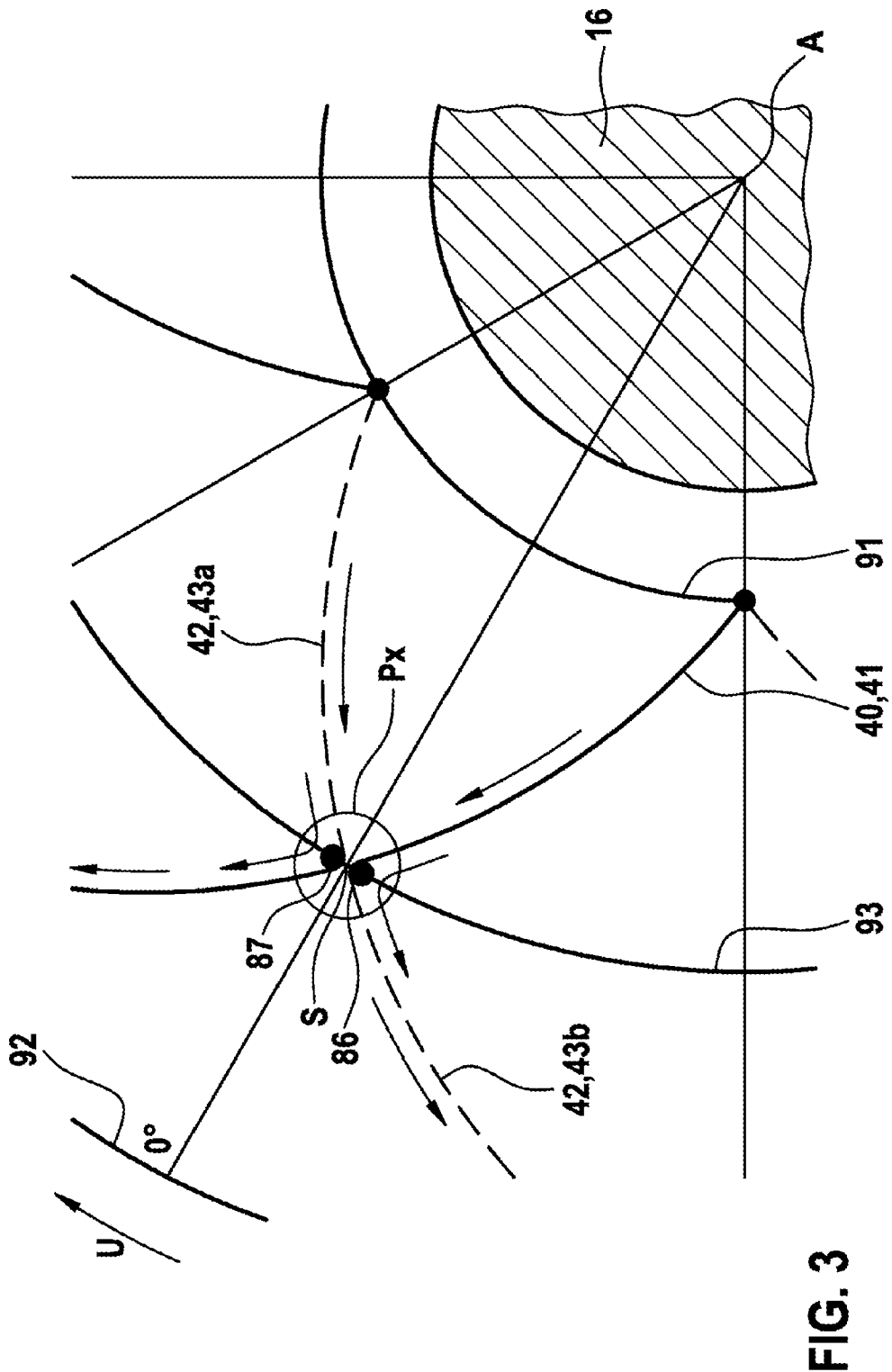
FIG. 3 shows an enlarged detail of FIG. 2.

FIG. 3 shows an enlarged detail from FIG. 2 in the area of the two connection vias 86, 87. In the figure it is easily identified that the two connection vias 86, 87 are arranged immediately adjacent to each other in the region of the virtual intersection point Px of the conductor track 40 curved to the right and the conductor track 42 curved to the left.

Figure 4:
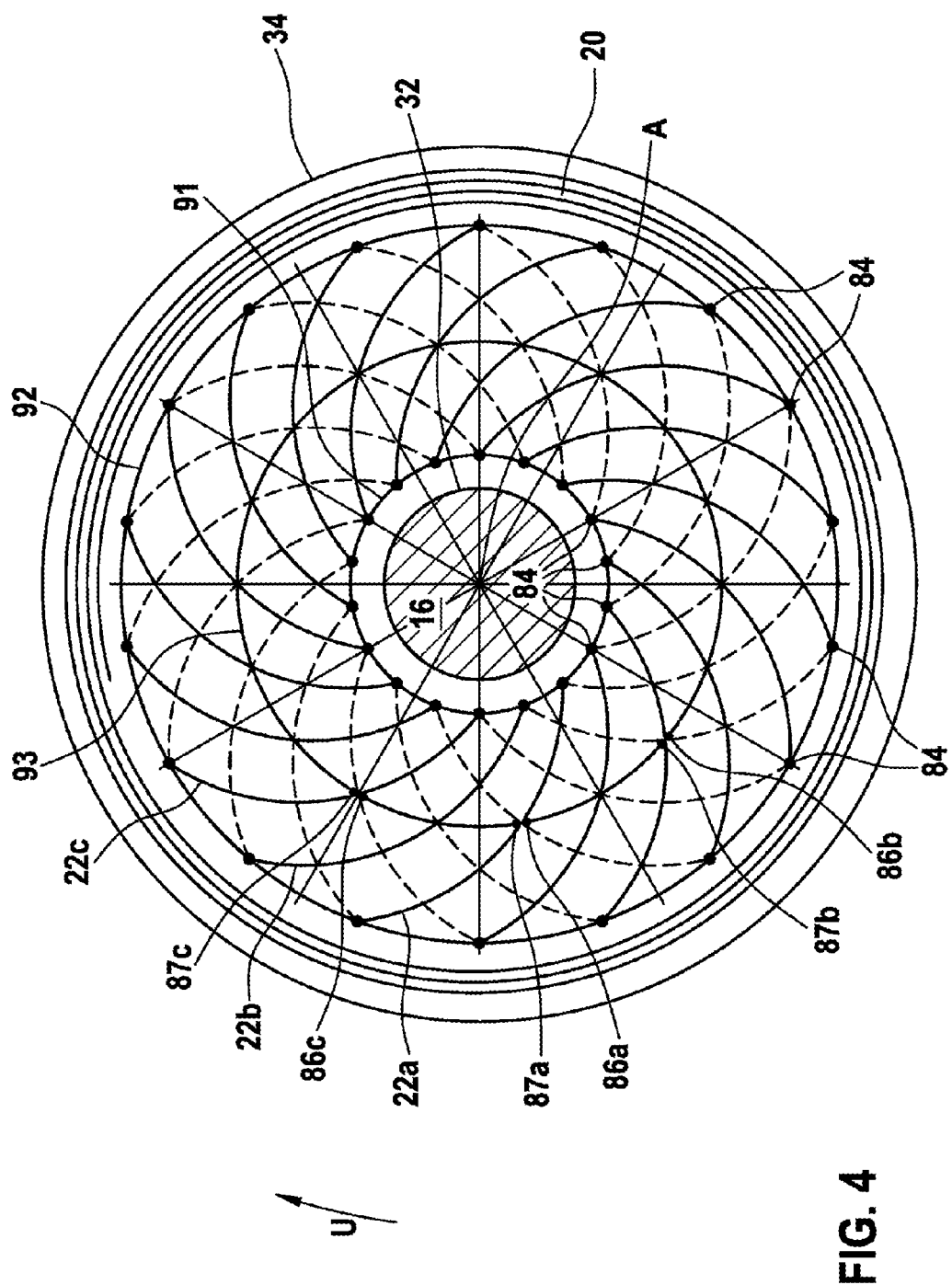
FIG. 4 shows a schematic plan view of the stator element of FIG. 2, in which three receiver coils of a measuring system are shown.

FIG. 4 illustrates a stator element 12 which has three receiver coils 22a, 22b, 22c—similarly to FIG. 2, in which for reasons of clarity only one of the three receiver coils 22 was shown. The first, second, and third receiver coil 22a, 22b, 22c are arranged within the transmitter coil 20. They substantially completely surround the axis of rotation A in the circumferential direction. The measuring range is again β=120°. In principle, it is also possible to arrange the transmitter coil 20 on the printed circuit board 18 in the area between the axis of rotation A and the first circle 91. In this case, the receiver coils 22a, 22b, 22c would be arranged outside of the transmitter coil 20. In principle, it is also possible to arrange the transmitter coil 20 partially radially inside the first circle 91 and partially radially outside of the second circle 92.

The receiver coils 22a, 22b, 22c, similarly to the receiver coil 22 from FIG. 2, are implemented from circular-arc-shaped conductor tracks 40, 42, which all have the same radius of curvature. Due to the specific shape of the receiver coils 22a, 22b, 22c, it is possible that alternating voltages are induced in the receiver coils 22a, 22b, 22c, whose amplitudes (as measurement signals) depend on the rotation angle of the rotor element 14 according to a sine function. This allows a particularly simple evaluation of the measurement signals in order to determine the angle of rotation.

For example, the evaluation unit 24 can apply an alternating voltage to the transmitter coil 20, which has a frequency in the range of a few MHz (preferably 5 MHz) and/or has amplitudes in the range 0.5 V to 10 V (preferably 1.5 V). This creates an electromagnetic alternating field which is coupled into the receiver coils 22a, 22b, 22b and induces corresponding alternating voltages there. Through appropriate shaping of the induction segments 26 the coupling between the transmitter coil 20 and the receiver coils 22a, 22b, 22c is manipulated as a function of the angle of rotation. The typical range of values of the coupling factor, i.e. the amplitude ratio between receiver coil and transmitter coil, of the transmitter coil 20 with the receiver coils 22a, 22b, 22b can be between −0.3 and +0.3. By demodulation of the measurement signal induced in the receiver coils 22a, 22b, 22c with the carrier signal (signal of the transmitter coil) the amplitude and phase of the coupling can be deduced. The amplitude varies continuously with the angle of rotation. The phase is ideally 0° or 180°.

The measuring range β of the rotation angle sensor 10 is, for example, 120° as shown above. In principle, it can take any value less than 360°.

The printed circuit board 18, shown here by way of example as circular or annular in shape, is bounded to the inside by an inner radius ri and to the outside by an outer radius ra. The outer radius ra is bounded from above by the available installation space and can have a value between 10 and 50 mm, approximately 25 mm. The inner radius ri can be dimensioned such that at the axis of rotation A, a through passage is enabled for the shaft in the stator element 12, but it can also have a value of nearly 0 mm or 0 mm, for example, if this through passage is not needed.

The receiver coils 22a, 22b, 22c are constructed from circular-arc-shaped conductor tracks 42 curved to the left and circular-arc-shaped conductor tracks 40 curved to the right. Each curvature direction is to be understood from a viewing direction extending radially outwards from the axis of rotation A.

The second receiver coil 22b and the third receiver coil 22c are designed substantially identically to the first receiver coil 22a, but arranged on the printed circuit board 18 rotated relative thereto along the circumferential direction U.

The intersection points of the circular-arc-shaped conductor tracks 40, 42 of the first, second and third receiver coils 22a, 22b, 22c are located on the first circle 91 (with the first radius r1), the second circle 92 (with the second radius r2) and the third circle 93 (with the third radius r3). The third radius r3 is calculated as the mean value of the first radius r1 and the second radius r2: r3=(r1+r2)/2.

The intersection points of the circular-arc-shaped conductor tracks 40, 42 are spaced apart in the circumferential direction by the same angle. The angle between the intersection points is β/4 (here 30°). The intersection points of the circular-arc-shaped conductor tracks 40, 42 of the receiver coil 22a are located, for example, at 0°, β/4, β/2, 3β/4, and β. The intersection points of the circular arc-shaped conductor tracks 40a, 40b of the receiver coils 22b and 22c are offset relative to those of the receiver coils 22a in each case by ⅔*(β/4)=β/6, i.e. 20°, to the left and right.

In general, the required geometric rotation ξ of the receiver coils 22 is obtained from the measuring range β and the number of the receiver coils m in accordance with ξ=β/m for m≥3 or ξ=β/(2 m) for m=2.

In the exemplary embodiment illustrated for a three-phase system (m=3) this results in a geometric rotation ξ of the three receiver coils 22a, 22b, 22c by 40° (ξ=120°/(3)=40°).

It is possible to implement the three receiver coils 22a, 22b, 22c in only two layers of the printed circuit board 18. For example, the circular-arc-shaped conductor tracks 40, 42 can be arranged on the two sides of the printed circuit board 18. An implementation in only two layers has the advantage of using a low-cost printed circuit board 18. In addition, the average distance of all receiver coils 22a, 22b, 22c to the rotor element 14 is almost identical, so that approximately equal signal levels for the measurement signals are achieved and the back calculation is simple and robust to implement.

This can be achieved as follows: all circular-arc-shaped conductors 40 curved to the right of the three receiver coils 22a, 22b, 22c are arranged on the first layer 19a of the circuit board, whereas all conductor tracks 42 curved to the left are arranged on the second layer 19b of the circuit board 18. At their ends the conductor tracks 40, 42 are connected by means of vias 84, not all of which are marked with reference symbols for reasons of clarity.

To achieve the opposite orientation of current flow in adjacent partial windings, in the exemplary embodiment in the same way as in FIGS. 2 and 3 two connection vias 86, 87 are provided for each of the three receiver coils 22a, 22b, 22c: for the first receiver coil 22a the two connection vias 86a, 87a, for the second receiver coil 22b the two connection vias 86b, 87b, and for the third receiver coil 22c the two connection vias 86c, 87c.

Figure 5:
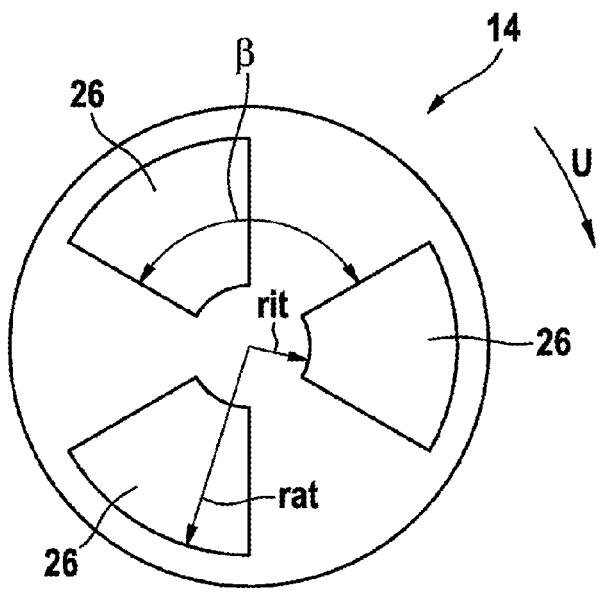
FIG. 5 shows a schematic plan view of a rotor element for the rotation angle sensor shown in FIG. 1.

FIG. 5 shows a schematic plan view of a rotor element 14, which is designed as a full circle. It is also possible that only an angular range of the rotor element 14 shown in FIG. 5 is used, which comprises one or more of the induction segments 26.

The rotor element 14 can be implemented as a printed circuit board with induction segments 26 as metallization of the circuit board or as a metal stamped part, in which the induction segments 26 are elevations or depressions in the stamped part.

The induction segments 26 are circular-arc-shaped, each of which extends over half of the measuring range R, i.e. as shown here over 60°.

Preferably straight or linear radial boundary lines are used, which guarantees a very simple and reliable production process.

The inner radius rit and the outer radius rat of the induction segments 26 can be selected depending on the internal radius ri of the inner circle 32 and/or the outer radius ra of the outer circle 34 of the transmitter coil 20. For example, rit=ri and rat=ra can apply.

Figure 6:
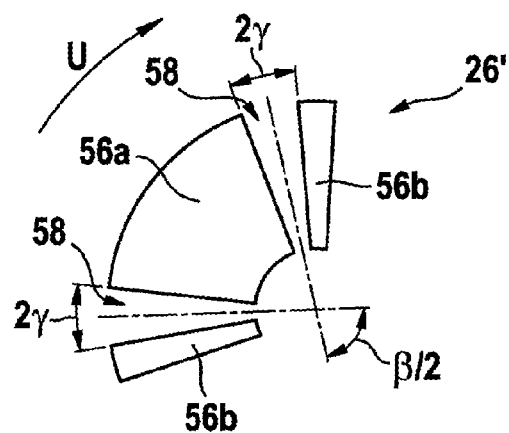
FIG. 6 shows a schematic plan view of an alternative induction segment for the rotor element shown in FIG. 5.

FIG. 6 shows an alternative embodiment of an induction segment 26', which is composed of a plurality of sub-segments 56a, 56b. Each of the induction segments 26' of FIG. 6 can be formed in the same way as the induction segment of FIG. 5. Straight or linear radial edges are preferably used.

The sub-segments 56a, 56b are separated from one another by recesses 58 (for example, milled slots), which have a different conductivity to the sub-segments 56a, 56b. By this method, the accuracy of the sinusoidal shape of the measurement signals can be significantly improved.

Each of the recesses 58 can have a width, for example, of an angle of 2γ in the circumferential direction U. In this case, the middle sub-segment can have an angle of β/2-2γ and the outer segments an angle of γ.

Figure 7:
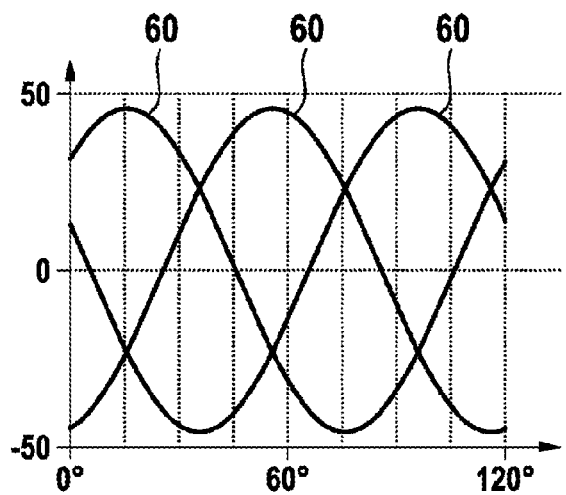
FIG. 7 shows a diagram with measurement signals generated by a rotation angle sensor in accordance with one embodiment of the disclosure.

FIG. 7 shows a diagram with three sinusoidal measurement signals 60, which can be output by the receiver coils 22a, 22b, 22c of a stator element 12 according to figure and which can be approximated more closely to a sine function by means of a rotor element 14 with one or more induction segments 26' in accordance with FIG. 6. The measuring signals represent the amplitude of an alternating voltage induced in a receiver coil, which depends on the angle of the rotor element 14 relative to the stator element 12.

Due to different lengths of supply cables, the positioning of conductor tracks in different layers of the printed circuit board 18 and mechanical tolerances, the measuring signals 60 can be subject to offsets, for example (i.e. in such a case the three measurement signals 60 do not extend symmetrically with respect to the x-axis).

This offset can be cancelled out of highly sinusoidal measurement signals 60 particularly easily, for example using a Clarke transformation. Highly sinusoidal measurement signals can also be advantageous, because trigonometric laws such as $\sin^2+\cos^2=1$ are applicable to them and can be used to provide a plausibility check of the signals or even to apply a correction.

For example, in the three receiver coils 22a, 22b, 22c three sinusoidal measurement signals 60 are produced with a typically 120° electrical phase shift, which by applying a Clarke transformation can be converted into a sine/cosine system. The arctangent function can then be used to derive the rotation angle from this.

It is also possible for the rotation angle sensor 10 to have only two receiver coils 22 with a 90° electrical phase shift (wherein the mechanical and electrical phase shift may differ). In this case, by multiplying the amplitude of the two measurement signals 60 by the cosine of the phase an (ideally) offset-free sine/cosine system is obtained. The arctangent function can then be used to derive the rotation angle of the rotor element 14.

In general, to perform the back calculation of the measurement signals 60 using the arctangent function at least two receiver coils 22a, 22b are required.

For redundancy reasons, the rotation angle sensor 10 can also be equipped with more than two receiver coils 22, e.g. with four or six receiver coils 22, which can all be implemented, for example, in two layers of the printed circuit board 18. Any three of the six receiver coils 22 can then be used as a redundant three-phase system. Because the receiver coils 22 are then all the same distance away from the rotor element 14 on average (in comparison to an implementation in six or more layers), the offset of the measurement signals 60 is approximately identical and the levels are comparatively high. This simplifies the evaluation considerably.

Finally, it is also noted that terms such as "having", "comprising", etc. do not exclude any other elements or steps, and terms such as "one" or "a/an" do not exclude a plurality. Reference numerals in the claims are not to be regarded as restrictive.

The invention claimed is:

1. A rotational angle sensor for detecting a rotational angle, comprising:
   a stator element having a transmitter coil and at least two receiver coils, the transmitter coil and the receiver coils arranged on a circuit board; and
   a rotor element which is mounted with respect to the stator element so as to be configured to rotate about an axis of rotation and via which the transmitter coil is inductively coupled to the receiver coils so that the inductive coupling is dependent on a rotational angle between the stator element and the rotor element and the transmitter coil induces at least two angle-dependent alternating voltages in the receiver coils,
   wherein the rotational angle sensor has a measuring range given by the quotient of 360° and an integer natural number,
   wherein the receiver coils substantially completely enclose the axis of rotation in a circumferential direction, each receiver coil formed by a plurality of adjacent partial windings oriented in opposite directions with respect to the direction of current flow,
   wherein each partial winding, with respect to a radial direction that extends outwards from the axis of rotation, is formed from sections of at least two circular-arc-shaped conductor tracks curved to the left and two circular-arc-shaped conductor tracks curved to the right,
   wherein all conductor tracks curved to the left and all conductor tracks curved to the right have the same radius of curvature and extend between two concentric circles around the axis of rotation, wherein the two concentric circles include a first circle with a first radius and a second circle with a second radius, a third circle is located concentric with the first circle and has a third radius given by the mean value of the first radius and the second radius, wherein a first circular-arc-shaped conductor track curved to the right passes through three points, including:
a first point, which lies on the first circle,
a second point, which lies on the third circle and is rotated with respect to the first point in the circumferential direction by a quarter of the measuring range, and
a third point, which lies on the second circle and is rotated with respect to the first point in the circumferential direction by half the measuring range, wherein the other circular-arc-shaped conductor tracks curved to the right are derived from the first circular-arc-shaped conductor track curved to the right by a rotation about the axis of rotation in the circumferential direction by half the measuring range, and wherein the conductor tracks curved to the left are obtained by reflections of the conductor tracks curved to the right, in each case along a radial line which extends from the axis of rotation through the intersection point of the respective conductor track curved to the right with the third circle.

2. The rotation angle sensor as claimed in claim 1, wherein one or more of:
each partial winding is formed from sections of exactly two circular-arc-shaped conductor tracks curved to the left and sections of exactly two circular-arc-shaped conductor tracks curved to the right, and
the sections of the circular-arc-shaped conductor tracks curved to the left and the circular-arc-shaped conductor tracks curved to the right, viewed in the circumferential direction, extend substantially over an angular range of at least 20% of the measuring range.

3. The rotational angle sensor as claimed in claim 1, wherein the circuit board extends between an inner circle with an inner radius and an outer circle with an outer radius and concentric with the inner circle, wherein the inner circle is concentric with the axis of rotation, wherein the first radius is larger than the inner radius by at least 1 mm and at most 5 mm, and/or wherein the second radius is smaller than the outer radius by a maximum of at least 1 mm and at most 5 mm.

4. The rotational angle sensor as claimed in claim 1, wherein the rotor element and the receiver coils are configured such that an alternating voltage is induced in the receiver coils, whose amplitude depends sinusoidally on the angle of rotation.

5. The rotational angle sensor as claimed in claim 1, wherein all the conductor tracks curved to the right are arranged on a first side of the circuit board and all conductor tracks curved to the left are arranged on a second side of the circuit board opposite the first side.

6. The rotational angle sensor as claimed in claim 1, further comprising vias disposed at ends of the circular arc-shaped conductor tracks, the vias configured to connect circular arc-shaped conductor tracks in different layers.

7. The rotational angle sensor as claimed in claim 1, wherein:
the circuit board has a first connection via and a second connection via, the first and second connection vias on the third circle are arranged immediately adjacent to a virtual intersection point of a conductor track curved to the right and a conductor track curved to the left, the conductor track curved to the right and the conductor track curved to the left are interrupted in the region of the first and second connection vias, and
at each of the first and second connection vias a radially outward partial section converging with a radially inward partial section of the conductor track curved to the right and a partial section of the conductor track curved to the left are electrically conductively connected to each other.

8. The rotational angle sensor as claimed in claim 1, wherein the receiver coils are offset relative to one another in the circumferential direction at an angle determined by the measuring range divided by a number of the receiving coils.

9. The rotational angle sensor as claimed in claim 1, wherein one or more of:
the rotor element has at least one induction segment with a different conductivity than adjacent regions of the rotor element located next to the at least one induction segment in the circumferential direction about the axis of rotation, and
the at least one induction segment is annular sector-shaped.

10. The rotation angle sensor as claimed in claim 9, wherein the at least one induction segment has an opening angle in the circumferential direction that is half the size of the measuring range of the rotation angle sensor.

11. The rotation angle sensor as claimed in claim 9, wherein one or more of:
the at least one induction segment has a plurality of radial recesses having a different conductivity than the induction segment,
the recesses are arranged at an edge in the circumferential direction of the induction segment,
the recesses are spaced apart in the circumferential direction by an angle which is half the size of the measuring range of the rotation angle sensor.

12. A stator element for a rotational angle sensor with a measuring range given by the quotient of 360° and an integer natural number, the stator element comprising:
a transmitter coil and at least two receiver coils all arranged on a circuit board,
wherein the receiver coils substantially completely enclose an axis of rotation in a circumferential direction, each receiver coil formed by a plurality of adjacent partial windings oriented in opposite directions with respect to the direction of current flow,
wherein each partial winding, with respect to a radial direction that extends outwards from the axis of rotation, is formed from sections of at least two circular-arc-shaped conductor tracks curved to the left and two circular-arc-shaped conductor tracks curved to the right,
wherein all conductor tracks curved to the left and all conductor tracks curved to the right have the same radius of curvature and extend between two concentric circles around the axis of rotation,
wherein the two concentric circles include a first circle with a first radius and a second circle with a second radius, a third circle is located concentric with the first circle and has a third radius given by the mean value of the first radius and the second radius,
wherein a first circular-arc-shaped conductor track curved to the right passes through three points, including:
a first point, which lies on the first circle, a second point, which lies on the third circle and is rotated with respect to the first point in the circumferential direction by a quarter of the measuring range, and a third point, which lies on the second circle and is rotated with respect to the first point in the circumferential direction by half the measuring range, wherein the other circular-arc-shaped conductor tracks curved to the right are derived from the first circular-arc-shaped conductor track curved to the right by a rotation about the axis of rotation in the circumferential direction by half the measuring range, and wherein the conductor tracks curved to the left are obtained by reflections of the conductor tracks curved to the right, in each case along a radial line which extends from the axis of rotation through the intersection point of the respective conductor track curved to the right with the third circle.

* * * * *